May 22, 1956　　H. D. THOMPSON ET AL　　2,746,092
MEANS FOR THE TREATMENT OF VEGETABLE FIBRES
Filed June 26, 1951　　2 Sheets-Sheet 1
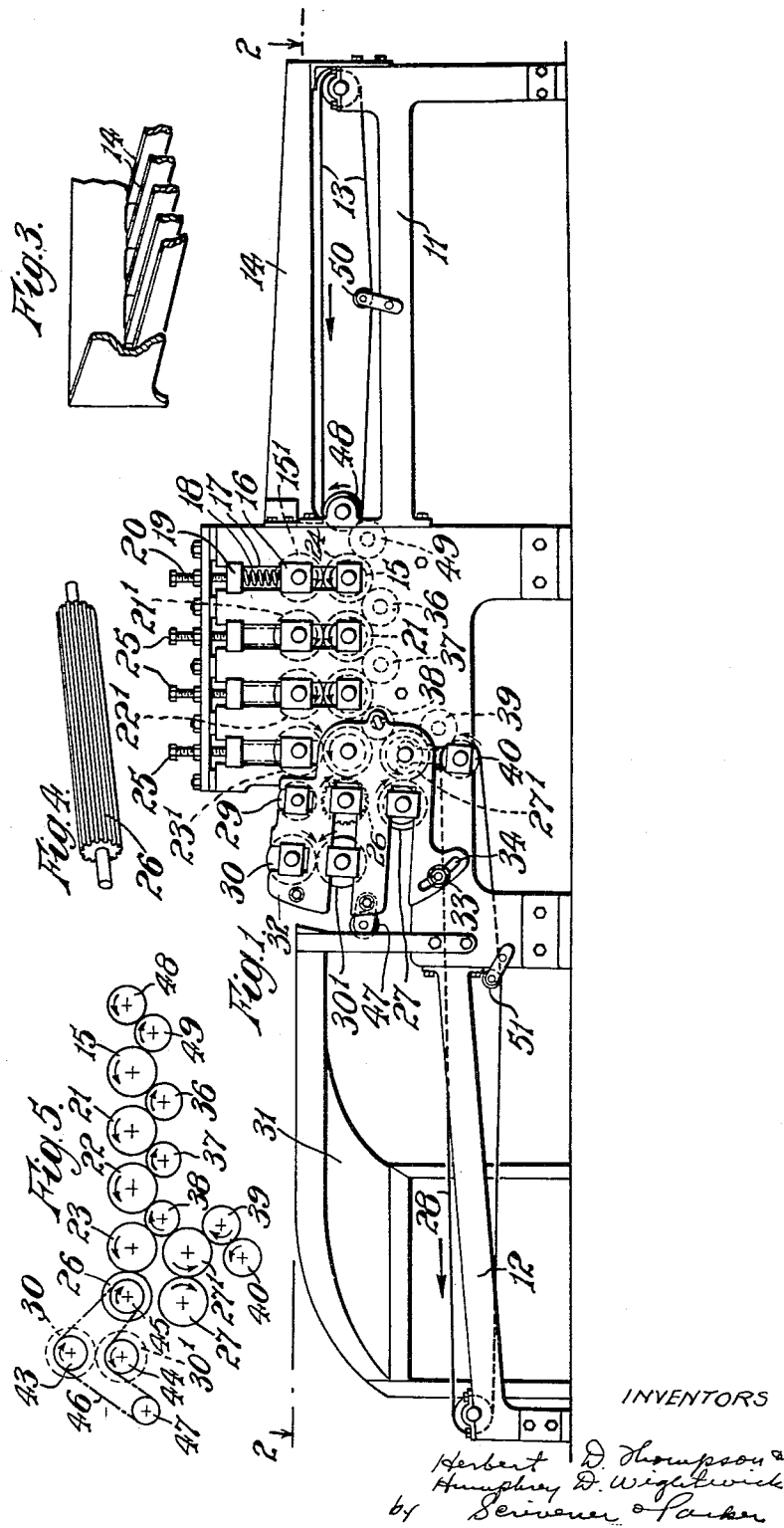
INVENTORS
Herbert D. Thompson &
Humphrey D. Wrightwick
by Scrivener & Parker

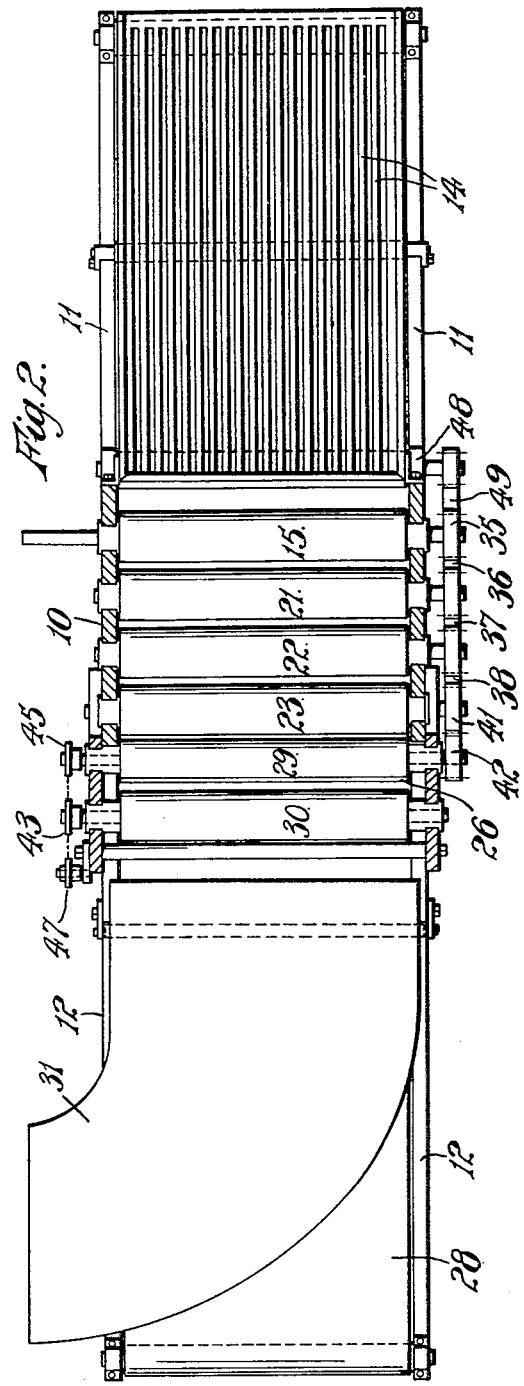

United States Patent Office 2,746,092
Patented May 22, 1956

2,746,092
MEANS FOR THE TREATMENT OF VEGETABLE FIBRES

Herbert Donald Thompson and Humphrey Dudley Wightwick, Umtali, Southern Rhodesia, assignors of one-third to Rhodesian Jute Industries Limited Application June 26, 1951, Serial No. 233,646

Claims priority, application Great Britain June 29, 1950

9 Claims. (Cl. 19—10)

This invention relates to new or improved means for the treatment of vegetable fibres and more particularly to means for separating the fibre-containing bark of plant stems from the core prior to retting in the preparation of fibres for the spinning of threads or yarns. This process is commonly known as decortication.

One object of our invention is to provide a machine for this purpose which is of simple construction, is efficient in use, is easily maintained, and can readily be made in a portable form if desired so that fibres can be separated at or adjacent to the point where the plants are grown and the cost of transport of the material is reduced to a minimum.

Another object is to provide a machine which can be driven by a wide variety of power plants either self contained in the machine or external such as the power take-off pulley or shaft of a tractor.

Another object is to provide a machine which will operate efficiently with plant stems varying widely in thickness or diameter.

According to our invention a machine for the decortication of fibrous vegetable stems or stalks comprises a series of pairs of cooperating splitting rollers through which the stems are successively fed and which split the stems lengthwise and loosen the fibre-containing bark from the central core, in combination with a separating roller arranged at the rear of the last pair of splitting rollers and rotating in the opposite direction to the splitting rollers to separate the bark from the core and take it off in a direction at an angle to the direction of movement of the core.

The separating roller will have a surface of a form adapted to operate efficiently on the split stalks as they emerge from the splitting rollers to strip the loosened bark continuously from the core, the precise nature of the surface depending on the particular variety and/or condition of the stalks or stems to be dealt with. For example, the separating roller may have a rigid surface which will normally be longitudinally fluted or corrugated.

The bark leaving the separating roller is conveniently engaged by a pair of driven delivery rolls which feed it onto a delivery conveyor or the like for collection and removal.

The cores from which the bark has been stripped pass on beyond the separating roller and are discharged into a shoot or the like by another pair of delivery rollers.

The splitting rollers may be made of any suitable material, and the rollers of each pair are preferably arranged with their axes in the same vertical plane, the bottom roller being positively driven and the upper roller being an idler which is resiliently urged towards the bottom roller by springs of which the loading is adjustable. The surfaces of the rollers may be smooth or may be roughened, grooved or ribbed according to the nature of the material to be dealt with.

The upper rollers may be of steel with smooth surfaces while the bottom rollers may be covered with natural or synthetic rubber or other similar material.

As the stems pass through the splitting rollers the bark is split longitudinally along the line of contact with the upper rollers and each stem is flattened out into a ribbon with the bark on the underside of the core, the rubber covering of the bottom rollers protecting the bark from damage.

Any leaves on the stems remain on the bark and pass out of the machine with the bark.

At the feeding end of the machine there is preferably provided a feed-box into which the stems are placed by hand and which is so arranged that the stems are prevented from overlapping, are distributed over the full width of the machine, and are aligned at right angles to the rollers. From the feed-box the stems pass between feeding rollers which feed them on through the splitting rollers.

The machine can be made in various sizes and may be arranged as a stationary machine for use in a shed or other building to which the stems or stalks are brought for treatment, or it may be made as a portable unit mounted on a trailer or other wheeled vehicle so that it can be taken to the fields where the plants are grown.

One practical machine in accordance with our invention is illustrated by way of example in the accompanying drawings in which:

Figure 1 is a side elevation of the complete machine.

Figure 2 is a plan of the machine in part section on the line 2—2 of Figure 1.

Figure 3 is a fragmentary perspective view of a portion of the feed box.

Figure 4 is a perspective view of the separating roller.

Figure 5 is a diagrammatic side elevation of the driving arrangements for the various rollers and other driven members.

The machine illustrated is designed to be portable and to be mounted on a trailer or other vehicle, but it may be employed in a fixed position. The mechanism is mounted in a frame which is built up from castings, rolled sections, and sheet, and which comprises a main frame 10 and extensions 11, 12 on its front and rear ends respectively to support the feeding and take-off means.

At the front or feeding end of the machine there is a horizontal conveyor belt 13 over which is mounted a fixed feed box comprising a series of spaced parallel longitudinal bars or strips 14 defining parallel slots. Plant stems to be decorticated are fed by hand into the feed-box and drop onto the conveyor belt which advances them into the machine, the bars or strips 14 ensuring that the stems are fed into the separating rollers at right angles thereto, that the stems do not overlap others on each side, and that they are distributed over the full width of the rollers.

The conveyor belt feeds the forward ends of the stems between a pair of vertically aligned horizontal feed rollers 15, 15' of which the lower one 15 is positively driven and the upper one 15' is a spring-loaded idler. The idler roller 15' is rotatably mounted at its ends in blocks 16 which are slidable in vertical slots 17 in the frame, and compression springs 18 are arranged between the blocks 16 and further blocks 19 which are backed by adjustable studs 20 so that the spring loading between the rollers 15 and 15' can be adjusted to suit the plant stems being dealt with.

The rollers 15 and 15' feed the stems on through three further pairs of spring-loaded splitting rollers 21, 21', 22, 22', and 23, 23'. The lower roller of each pair is positively driven and is covered with rubber or equivalent material 24. The upper roller is a smooth-surfaced steel roller and is urged towards the lower roller by springs of which the loading is adjustable by screwed studs 25 similar to the studs 20.

As the plant stems pass through the splitting rollers they are split longitudinally along their line of contact with the steel upper rollers and the stems are flattened out into ribbon form with the split bark below the cores of the stems, the bark being protected by the rubber-covered bottom rollers.

As each stem passes out from the last pair of splitting rollers 23, 23' it meets a separating roller 26 which is in horizontal alignment with the bottom roller 23 but rotates in the opposite direction. The surface of this roller is longitudinally fluted or grooved as shown in Figures 1 and 4.

The ends of the split bark, which is soft and flexible, drop down into the nip between the roller 23 and the separating roller 26 and the bark is caught and carried downwardly to a pair of rubber-covered bark delivery rollers 27, 27' which feed it onto a conveyor belt or apron 28. This takes it to the delivery end of the machine from which it is taken away by hand.

Meanwhile the cores of the stems which are stiffer than the bark pass on from the rollers 23, 23' over the top of the separating roller 26 and below an idler roller 29 which guides them to a pair of core delivery rollers 30, 30'. These rollers feed the cores out onto a curved shoot 31 which delivers them at one side of the machine.

In the separation of the fibre-containing bark from the core of a stem, once the bark has been caught between the separating roller and the last splitting roller 23 and the core has been picked up by the rollers 30, 30' any tendency for the bark to adhere to the core is overcome by the movement of the bark and core in directions substantially at right angles to each other.

To allow for adjustment of the angle at which the bark and cores are taken off relative to the feed through the splitting rollers the separating roller 26, bark delivery rollers 27, 27', idler roller 29, and core delivery rollers 30, 30' are all mounted in a sub-frame 32 which is angularly movable on the main frame 10 about an axis coincident with that of the roller 23. The sub-frame is secured in its adjusted position by a clamping nut 33 on a stud fixed in the main frame and passing through an arcuate slot 34 in the sub-frame.

In the passage of the stems through the splitting rollers the split bark is only in contact with the rubber covered bottom roller of each pair so that the fibres are not damaged.

The surface speeds of all the driven rollers in the mechanism are identical.

The drive for the driven rollers and conveyors can be arranged in various ways.

In the machine illustrated the bottom feed roller 15 is driven by a belt or chain through reduction gearing from a source of power and the bottom splitting rollers 21, 22, 23 are driven from a gear wheel 35 on one end of the roller 15 through intermediate idler gears 36, 37 and 38 meshing with gear wheels on the rollers. The idler gear 38 also drives the bark delivery roller 27' to which the other bark delivery roller 27 is geared, and the roller 27' drives through an idler gear 39 the drum or pulley 40 of the bark delivery conveyor 28. The idler gear 38 meshes with a gear wheel 41 on the bottom roller 23 of the last pair of splitting rollers and the gear wheel 41 also meshes with a gear wheel 42 on the separating roller 26 to drive that roller at the same speed as the roller 23 but in the opposite direction.

The core delivery rollers 30 and 30' carry chain sprockets 43, 44, and are driven from a sprocket 45 on the separating roller 26 by a chain 46 which is carried round an idler sprocket 47 by which the tension of the chain can be adjusted.

The drum or pulley 48 of the feeding conveyor 13 is driven through an idler gear 49 from the main driving roller 15.

The conveyor belts 13 and 28 are tensioned by jockey pulleys 50, 51 engaging with their lower runs.

The machine illustrated is designed to be mounted on a trailer so that it can be readily taken to a site where the plant stems to be decorticated are grown. The trailer will carry an internal combustion engine or like power unit coupled to the main driving roller through a reduction gear-box and a driving chain or belt.

Small machines may be adapted for operation by hand where power is not available.

The speed at which the rollers are driven will depend to some extent on the plant stems to be treated, and rollers of different materials and having different surfaces may be employed for different plant stems.

One important advantage of our improved machine is that in the separation of the bark from the core of a plant stem, leaves attached to the bark are not stripped off but go through with the bark and are put into the retting tank with the bark. This is essential for the successful retting of many fibre plants as the leaves contain bacteria required for the retting process.

We claim:

1. A machine for the decortication of fibrous vegetable stalks having a fibre-containing bark enclosing a core, comprising a series of pairs of co-operating splitting rollers, the rollers of each pair being arranged with their axes in a common vertical plane and the lower roller of each pair being covered with yielding material, means for urging the upper roller of each pair resiliently towards the lower roller, means for driving the lower rollers of all the pairs in the same direction and at the same peripheral speed, means for feeding the stalks successively through said pairs of splitting rollers which split the stalks and loosen the fibre-containing bark from the core, and a separating roller mounted substantially in horizontal alignment with the lower roller of the last pair of splitting rollers and driven in the opposite direction thereto for separating the bark of the stalks from the core and taking it off in a downward direction.

2. A machine as in claim 1 wherein the surface of the said separating roller is longitudinally fluted.

3. A machine as in claim 1 wherein an idler roller is arranged above and spaced from the said separating roller to guide the cores of the stalks which pass over the separating roller to a pair of driven core delivery rollers.

4. A machine as in claim 1 wherein said means for feeding the stalks between the splitting rollers comprise a pair of feeding rollers arranged in advance of the splitting rollers, and a feed box arranged in advance of the feeding rollers for directing the stalks into the feeding rollers.

5. A machine as claimed in claim 1 wherein the means for feeding the stalks to the splitting rollers comprise a pair of feeding rollers mounted in advance of the splitting rollers, and a feed-box mounted in advance of the feeding rollers and including a belt conveyor and a series of spaced parallel bars arranged over the conveyor and defining longitudinal stalk-receiving slots at right angles to the feeding rollers.

6. A machine as claimed in claim 1 incorporating bark delivery rollers for taking away the bark from the separating roller, core delivery rollers for taking away the cores passing over the separating roller, and a sub-frame in which said separating roller, bark delivery rollers, and core delivery rollers are mounted, said sub-frame being angularly movable about an axis coincident with the axis of the bottom roller of the last pair of splitting rollers.

7. A machine for the decortication of fibrous vegetable stalks having a fibre-containing bark enclosing a core comprising in combination a feed box for the stalks, feeding rollers receiving the stalks from the feed box, a series of pairs of splitting rollers through which the stalks are fed by the feeding rollers and which split the stalks and loosen the fibre-containing bark from the cores, each pair of splitting rollers comprising a driven bottom roller covered with rubber and an idle spring-loaded upper roller, a fluted separating roller co-operating with the bottom roller of the last pair of splitting rollers to receive the separated bark and take it off in a downward direction, rubber-covered driven rollers for receiving the bark from the separating roller and feeding it to a delivery means, means for guiding the stripped cores of the stems or stalks over the separating roller, and delivery rollers for receiving the cores and discharging them.

8. A machine for the decortication of fibrous vegetable stalks having a fibre-containing bark enclosing a core, comprising a moving table adapted to move the stalks progressively into the machine, means guiding the stalks during their progress, a series of immediately adjacent pairs of splitting rollers through which the stalks are fed by said table and which split the stalks and loosen the fibre-containing bark from the cores, the surface of each of said splitting rollers being smooth and cylindrical, and the common tangent plane to each pair of said splitting rollers being common to all rollers, driving means adapted to drive said rollers in a manner such that all rollers on one side of said plane rotate in the same direction, a separating roller adjacent one of the final pair of splitting rollers to receive the separated bark and take it off at one side of the axis of the separating roller, the latter roller being spatially separated from said final pair of splitting rollers, said separating roller being disposed to one side of said common tangent plane, means for guiding the stripped cores of the stalks to the opposite side of the axis of the separating roller, and driving means adapted to drive said separating roller in a direction opposite to that of those splitting rollers on the same side of the plane.

9. A machine as specified in claim 8, comprising also a pair of delivery rollers for receiving the cores and discharging them, driving means for the delivery rollers, the latter having a common tangent plane common to said first-mentioned plane, and being disposed on that side of said separating roller which is remote from said splitting rollers.

References Cited in the file of this patent

UNITED STATES PATENTS

| | | |
|---|---|---|
| 388,665 | Green | Aug. 28, 1888 |
| 428,325 | Ward | May 20, 1890 |
| 442,735 | Stewart | Dec. 16, 1890 |
| 472,988 | Fremery | Apr. 19, 1892 |
| 561,532 | Allison | June 2, 1896 |
| 633,507 | Eke | Sept. 19, 1899 |
| 635,345 | Packer | Oct. 24, 1899 |
| 722,556 | Belding | Mar. 10, 1903 |
| 1,089,261 | Pos | Mar. 3, 1914 |